United States Patent Office 3,367,842
Patented Feb. 6, 1968

3,367,842
TEST COMPOSITION AND DEVICE FOR THE DETECTION OF GALACTOSE IN FLUIDS
Chauncey Orvis Rupe and Allen Chuol Hue, Elkhart, Ind., assignors to Miles Laboratories, Inc., Elkhart, Ind., a corporation of Indiana
No Drawing. Filed Feb. 17, 1965, Ser. No. 433,516
12 Claims. (Cl. 195—103.5)

ABSTRACT OF THE DISCLOSURE

Test means having increased sensitivity for detecting galactose in fluids comprising, in combination, galactose oxidase, a material having peroxidative activity, a chromogenic indicator and as the sensitizing means, a slightly water soluble metal compound such as zinc oxide or cadmium oxide.

---

This invention relates to new and improved test compositions and processes and is particularly concerned with enzymatic test methods and compositions containing slightly soluble metallic compounds, the compositions and methods being useful for the qualitative detection and quantitative determination of galactose in biological fluids, food extracts and ingested liquids. In one of its more particular aspects it relates to improved galactose test compositions impregnated into bibulous carriers.

Galactose is one of the naturally occurring aldohexoses. When ingested, it is normally absorbed from the intestines and converted into glucose which is assimilated by the tissues. In certain abnormal conditions, such as hepatic insufficiency and inborn errors of metabolism, galactose is not completely converted into glucose and is disposed of by excretion in the urine.

Clinical testing for hepatic failure and other abnormal conditions associated with an elevated galactose concentration in body fluids such as urine and blood has most often involved the use of certain complex, time consuming and often non-specific tests for the presence of galactose in such fluids.

Recently, however, it has been found that galactose may be rapidly determined or detected by utilizing, in the presence of oxygen, a highly specific enzyme, galactose oxidase, to catalyze the conversion of galactose to certain reaction products and subsequently determining or detecting these reaction products which are formed in stoichiometric quantities.

Since galactose test methods are extensively utilized in screening large numbers of body fluid samples as well as food extracts for the presence of this prognostic substance, these test must, of necessity, be rapid, simple and economical. In this respect, an apparently minor improvement is multiplied by the number of tests conducted and may result in a very significant overall improvement in the testing program.

It is therefore an object of the present invention to provide an improved test composition and process for the qualitative detection and quantitative determination of galactose. It is a further object to provide an extremely rapid and sensitive test composition for such a determination. It is another object to provide such a composition incorporated into a bibulous carrier. These and other objects will become apparent from the ensuing disclosure and the appended claims.

The most utilitarian prior art method for the specific detection and determination of galactose is by the aforementioned use of the enzyme galactose oxidase as disclosed in U.S. Patent No. 3,005,715 to J. A. D. Cooper. Such a method involves the catalytic oxidation of galactose using the enzyme galactose oxidase. The reaction takes place in the presence of oxygen and yields, as reaction products, hydrogen peroxide and, it is believed, a dialdehyde. The stoichiometric relation and subsequent determination of the hydrogen peroxide formed makes this analytic scheme quantitative, or, if desired the hydrogen peroxide may merely be detected to effectuate a qualitative test method. For purposes of convenience, the term detection, as used hereinafter, is defined as the quantitative analysis of galactose as well as the qualitative testing therefor.

In such detection of galactose U.S. Patent No. 3,005,715 discloses the use of an additional enzyme, peroxidase, to catalyze the response of an oxidation reduction indicator, such as o-tolidine, to the hydrogen peroxide formed, thus effectuating a visual response to the presence of galactose. This patent also teaches that the galactose oxidase catalyzed reaction of galactose with oxygen is enhanced by zinc cations which are added to the system in the form of the water soluble zinc acetate. Other soluble metal salts such as magnesium sulfate are found either to have no effect on the activity of the enzyme or to slightly retard such activity.

It has now quite unexpectedly been discovered that, contrary to these prior art teachings, the enzymatic oxidation test composition for galactose can be improved by the addition thereto of slightly soluble inorganic metal compounds. While the prior art teaches the enhancing of galactose oxidase activity by soluble zinc salts, it has been found that these soluble salts retard the color development in a test composition comprising galactose oxidase, peroxidase and an oxidation-reduction indicator impregnated into a bibulous carrier. On the other hand, the slightly soluble metal compounds enhance such a composition from the standpoint of sensitivity, speed of reaction and other test characteristics.

As used herein the term slightly soluble metal compound is defined as any inorganic metal compound having a solubility in distilled water up to about 0.1 g./liter at 18° C. It should be noted that the normal use of the term insoluble has little meaning to those skilled in the art since all compounds have a certain solubility in a liquid medium although such solubility may be quite low. For this reason, the use of the term slightly soluble, in the practice of the present invention, contemplates those inorganic metal compounds which are defined as insoluble in the literature as well as those compounds which are listed as having a limited solubility, providing the herein defined solubility limits are met.

Exemplary of the compounds which find use in the present invention are zinc oxide, cadmium oxide, cupric oxide, zinc carbonate, calcium carbonate, magnesium carbonate, cadmium carbonate and aluminum hydroxide.

In practice, the choice of metal compound for use in the compositions of the present invention, is dependent upon numerous factors, such as for example, economic availability, coloration, effectiveness, bulk added, etc. In this respect it has been found that the preferable metal compounds are the oxides, such as zinc oxide and cadmium oxide. It has also been found that the slightly soluble metal compounds of the present composition may be utilized singly or if conditions warrant, as various mixtures thereof.

In formulating the test composition, the optimum concentration of the metal compound varies with the particular compound being employed. For example when zinc oxide is utilized, the optimum concentration is about 4% by total weight of composition and when cadmium oxide is employed the optimum concentration of this compound is from about 0.20 to about 0.25% by total weight of composition. In determining such concentrations, there is generally a concentration limit where such compound has little or no effect on enhancing the activity of the system. In this respect, such increased concentration may even detract from the enhancement of the system.

Although each metal compound exhibits a particular optimum enhancement concentration, one skilled in the art may easily determine such concentration limits and optimum values by rather routine experimentation as will hereinbelow be illustrated in the examples.

The test composition of the present invention essentially comprises galactose oxidase, a material having peroxidative activity, an indicator responsive to hydrogen peroxide in the presence of the material having peroxidative activity, and, finally, the slightly soluble metal compound.

The material having the ability to catalyze the degradation of galactose is a rather specific enzyme, galactose oxidase, and may be prepared by a fermentation method as disclosed in the previously mentioned U.S. patent to J. A. D. Cooper, U.S. Patent No. 3,005,715. Such an enzyme specifically catalyzes the oxidation of galactose, in the presence of oxygen, to the aforementioned reaction products, hydrogen peroxide and a dialdehyde. The value of such a material resides in its specificity for galactose and thus enables a detection of galactose in the presence of other sugars such as glucose.

The material having peroxidative activity is, and as used herein is defined as, any material which catalyzes the response of an oxidation-reduction indicator to the hydrogen peroxide formed in the catalytic oxidation of the galactose. Generally this material comprises peroxidase which may be derived from several natural sources, i.e., horseradishes, potatoes, fig tree sap, turnips and white blood corpuscles. In addition to peroxidase, various other substances show peroxidase-like activity. Such substances include hemin, methemoglobin, oxyhemoglobin, hemoglobin, hemochromogen, alkaline hematin and urohemin.

For purposes of convenience, the peroxidases, and other such substances having the above described activity will hereinafter be referred to as materials having peroxidative activity, although it is understood that these materials may not all function in the same manner. Such materials having peroxidative activity therefore, by definition, include any substance which catalyzes or enhances the response of an indicator to hydrogen peroxide.

A wide variety of indicator materials which change color in response to hydrogen peroxide in the presence of the material having peroxidative activity may be used in the test compositions of this invention to produce a visual response of the system to the presence of galactose. For example, oxidation-reduction indicators such as gum guaiac, o-tolidine, 2,7-diaminofluorene, o-dianisidine, leucoindophenols and the like may be used for this purpose. The color forming substance preferred for the compositions of this invention is o-tolidine which has been found to give good color development.

In order to produce a test having the desired stability, reactivity and sensitivity it is essential that the aforementioned ingredients when contacted with the fluid being tested be buffered at a hydrogen ion concentration of from about pH 5.8 to about pH 7.5. Preferably an approximately neutral pH should be utilized, for example, one in the range of from about pH 6.8 to about pH 7.2. Of the numerous buffers which may be utilized to maintain the pH of the ingredients within the desired range, it has been found the phosphate buffers and a buffer which consist of a salt of glutamic acid and tris (hydroxymethyl) aminomethane produce results which, both with respect to stability and sensitivity, are quite acceptable. In addition to tris (hydroxymethyl) methylamine glutamate other dicarboxylic acid salts of tris (hydroxymethyl) aminomethane which may be used include tris (hydroxymethyl) methylamine phthalate, tris (hydroxymethyl) methylamine malonate and tricarboxylic acid salts of tris (hydroxymethyl) aminomethane such as tris (hydroxymethyl) methylamine citrate, for example.

In formulating the compositions of this invention it has also been found desirable to utilize polyvinyl alcohol as a conveyor or thickening agent for the compositions. The polyvinyl alcohol has also been observed to contribute certain protective qualities to these compositions. Other thickening agents, such as gelatin, bovine serum albumin, polyvinyl pyrrolidone (PVP), starch or sodium alginate may also be used, but polyvinyl alcohol is preferred because of its unexpected protective properties. The starch may also serve as a suspending agent for the insoluble metal compound.

Wetting agents or surface active agents may be used in the compositions of this invention to assure an even distribution of the ingredients upon the test sticks, and, after drying, a uniform wetting of the test stick when used. Various types of wetting agents may be used for this purpose including cationic, anionic and non-ionic varieties. Exemplary of the wetting agents which may be used are bis(2-ethylhexyl) sodium sulfosuccinate (Aerosol®OT) and polyoxyethylene sorbitan mono-oleate (Tween®81). Wetting agents are not essential, but their use contributes desired elegance to sticks made from the compositions of this invention.

The compositions described above may be readily prepared by adding the material having peroxidative activity, wetting agent, oxidation-reduction indicator and slightly soluble metal compound to a solution of the buffer at the desired pH and adding this mixture to a solution of galactose oxidase. To insure an even suspension, the mixture may be triturated at various steps in the compounding process. The completed fluid compositions may then be used as a dip for strips or sticks of bibulous carrier material. In each instance the impregnated bibulous carrier may be dried either at room temperature or at elevated temperatures depending upon consideration of time and ease of manufacture. In addition, a bibulous carrier, impregnated with a test composition not containing a metal compound, may be treated by simply physically forcing the slightly soluble metal compound into the already impregnated carrier, to effectuate a test device according to the present invention.

The specific nature or mechanism of the enhancing action of the metal compound is not known with certainty although it is postulated that such compounds either stimulate the activity of the galactose oxidase or material having peroxidase activity or acts as an adsorbing agent on which the color-producing reaction or reactions take place. Such enhancing activity may very well result from both of such concepts.

Because of the proposed nature of the enhancement mechanism, it is preferable that the final physical form of the test composition be a bibulous carrier impregnated with the composition; however, the test may also be utilized in the form of a tablet or a powder which comprises the test ingredients and the slightly soluble metal compound.

The ensuing examples are merely illustrative of the preferable practices of the present invention and are not to be construed as conferring any limitation on the inventive concept except as in the appended claims.

*Example 1*

A flask was charged with the following ingredients, in order presented: 2 ml. of 0.5 M phosphate buffer (pH 7), 2 ml. of a 1 mg./ml. aqueous solution of horseradish peroxidase, 3 ml. of deionized water, 1 ml. 2% bis(2-ethylhexyl) sodium sulfosuccinate in a 1:1 deionized water/ethanol solvent, and 2 ml. of 1% o-tolidine dihydrochloride in deionized water. The mixture was thoroughly agitated after each addition to effect solution of or evenly disperse the components. A second solution was prepared which comprised about 6,000 units/10 ml. galactose oxidase in a 15% aqueous starch solution. With constant stirring, 10 ml. of the galactose oxidase solution was added to the flask containing the buffer, peroxidase, etc. Strips of bibulous material (filter paper) were then dipped into the composite mixture of ingredients, and dried in a warm air oven at 70° C. for 10 minutes.

Four additional mixes of buffer, peroxidase, etc. were prepared and an amount of zinc oxide added to each in increments of 2, 4, 6 and 8% by total weight of mixture (including the galactose oxidase subsequently added). The added zinc oxide was triturated with the mix to effect a fine, even suspension. The galactose oxidase solution was then added and the composite thoroughly mixed, the starch in the galactose oxidase solution maintaining an even suspension of ingredients. Bibulous strips of filter paper were dipped into each of the mixtures and dried in a warm air oven at 70° C. for 10 minutes.

A series of urine samples containing 0.0%, 0.1%, 0.2% and 0.5% galactose were then tested with each of the impregnated bibulous strips. The following Table I shows the response time and the overall performance which is indicated as the performance score. The performance test was a series of observations whereby a test composition was evaluated for sensitivity, speed, inhibition due to specific gravity, ascorbic acid inhibition, quantitation, color quality of unreacted test composition, color quality of reacted test composition and stability.

In each of these tests, points were assigned to the particular composition being evaluated, depending on its performance. For example, in the sensitivity test each of the urine samples containing increments of galactose were tested. If the response at one minute reading time for the 0.1% concentration was adequate, the composition was rated 15 points; if the response was to the 0.2% concentration sample, the composition was rated 10 points, etc. Thus the higher the performance score the more improved the composition is over the prior art compositions.

In the response time evaluation, the test strips being evaluated were contacted with a urine sample containing 0.1% galactose. The response time was the number of seconds required for the test strip to exhibit a perceptable color change or response.

TABLE I

| Percent Zinc Oxide | Performance Score | Respones Time (sec.) |
|---|---|---|
| 0 | 62 | 17 |
| 2 | 69 | 17 |
| 4 | 71 | 8 |
| 6 | 62 | 11 |
| 8 | 66 | 12 |

As can be seen from Table I, the optimum zinc oxide concentration in this composition was about 4% by total weight of test composition.

*Example 2*

Mixtures were prepared as in Example 1 with the exception that instead of zinc oxide, cadmium oxide was added in increments of 0.0, 0.12, 0.25, 0.50 and 1.0% by weight. Bibulous strips were also impregnated with the test compositions as in Example 1 and urine samples containing galactose as in Example 1 were tested using these strips. The results shown below in Table II were obtained as in Example 1.

TABLE II

| Percent Cadmium Oxide | Performance Score | Response Time (sec.) |
|---|---|---|
| 0.0 | 62 | 17 |
| 0.12 | 68 | 15 |
| 0.25 | 71 | 8 |
| 0.50 | 62 | 19 |
| 1.0 | 69 | 15 |

As indicated in Table II the optimum concentration of cadmium oxide in the test composition was about 0.25%.

*Example 3*

As in the first part of Example 1, test strips were prepared which contained no added metal compound. Each of the metal compounds indicated in Table III below were then individually added, in dry form, to these test strips. This was accomplished by dusting the metal compound on the test strip and forcing an amount into the pores of the strip by rubbing with a spatula. The excess was then removed by shaking the strip. A drop of a 0.1% aqueous galactose solution was then added to each of the strips, an untreated strip acting as a control. The results are shown in Table III.

TABLE III

| Metal Compound | Effect on Activity of Strip Compared to Control Strip |
|---|---|
| Zinc Oxide | Increased—Very Good. |
| Zinc Carbonate | Do. |
| Zinc Chloride | Inhibited. |
| Aluminum Hydroxide | Increased. |
| Calcium Carbonate | Increased—Very Good. |

In summary, the present invention provides improved test compositions in an area where multiple tests are generally conducted. Such compositions comprise a slightly soluble metal compound and an enzymatic test system, which combination provides an improved test for the detection of galactose in various fluids. In addition these test compositions may be readily utilized in the form of "dip and read" tests by simply impregnating a bibulous carrier therewith.

What is claimed is:

1. A test composition for the detection of galactose in fluids in the presence of oxygen which comprises:
    (A) galactose oxidase;
    (B) a material having peroxidative activity;
    (C) an indicator material which changes color in response to hydrogen peroxide in the presence of the material having peroxidative activity; and,
    (D) an effective amount of an inorganic metal compound selected from the group consisting of zinc oxide, cadmium oxide, zinc carbonate, calcium carbonate and aluminum hydroxide, said metal compound having the ability to improve the sensitivity and speed of reaction of said composition when contacting galactose in the fluid being tested.

2. A test composition as in claim 1 wherein the metal compound is zinc oxide.

3. A test composition as in claim 1 wherein the metal compound is cadmium oxide.

4. A test composition as in claim 1 wherein the material having peroxidative activity is selected from the group consisting of peroxidase, hemin, methemoglobin, oxyhemoglobin, hemoglobin, hemochromogen, hematin and urohemin.

5. A test composition as in claim 1 wherein the material having peroxidative activity is peroxidase.

6. A test composition as in claim 1 wherein the indicator material is selected from the group consisting of o-tolidine, gum guaiac, 2,7-diaminofluorene, o-dianisidine and leucoindophenols.

7. A composition as in claim 1 wherein said composition additionally contains a buffer for maintaining the pH at a range of from about 5.8 to about 7.5.

8. A test device for the detection of galactose in fluids in the presence of oxygen which comprises a bibulous carrier impregnated with:
    (A) galactose oxidase;
    (B) a material having peroxidative activity;
    (C) an indicator material which changes color in response to hydrogen peroxide in the presence of the material having peroxidative activity; and,
    (D) an effective amount of an inorganic metal compound selected from the group consisting of zinc oxide, cadmium oxide, zinc carbonate, calcium carbonate and aluminum hydroxide, said metal compound having the ability to improve the sensitivity and speed of reaction of said device when contacting galactose in the fluid being tested.

9. A device as in claim 8 wherein the device additionally comprises a buffer for maintaining the pH at a range of from about 5.8 to about 7.5.

10. A process for detecting galactose in the presence of oxygen in fluids which comprises contacting said fluid with a composition comprising:
(A) galactose oxidase;
(B) a material having peroxidative activity;
(C) an indicator material which changes color in response to hydrogen peroxide in the presence of the material having peroxidative activity; and,
(D) an effective amount of an inorganic metal compound selected from the group consisting of zinc oxide, cadmium oxide, zinc carbonate, calcium carbonate and aluminum hydroxide, said metal compound having the ability to improve the sensitivity and speed of reaction of said composition when contacting galactose in the fluid being tested.

11. A process as in claim 10 wherein said composition additionally contains a buffer for maintaining the pH at a range of from about 5.8 to about 7.5.

12. A process as in claim 10 wherein said composition is impregnated into a bibulous carrier.

References Cited

UNITED STATES PATENTS

| | | | |
|---|---|---|---|
| 3,005,714 | 10/1961 | Cooper | 195—103.5 X |
| 3,066,081 | 11/1962 | Rorem et al. | 195—103.5 |
| 3,092,465 | 6/1963 | Adams et al. | 195—103.5 X |
| 3,099,606 | 7/1963 | Teller | 195—103.5 |
| 3,183,173 | 5/1965 | Oakes | 195—103.5 |
| 3,266,868 | 8/1966 | Harvill | 195—103.5 X |

ALVIN E. TANENHOLTZ, *Primary Examiner.*